(No Model.) 3 Sheets—Sheet 3.

J. J. RENEHAN.
CAR FENDER.

No. 559,084. Patented Apr. 28, 1896.

Witnesses,
J. F. Coleman
Arthur B. Jenkins

Inventor
James J. Renehan
by Chas. L. Burdett,
Atty.

United States Patent Office.

JAMES J. RENEHAN, OF NEW BRITAIN, CONNECTICUT.

CAR-FENDER.

SPECIFICATION forming part of Letters Patent No. 559,084, dated April 28, 1896.

Application filed June 19, 1895. Serial No. 553,349. (No model.)

*To all whom it may concern:*

Be it known that I, JAMES J. RENEHAN, a citizen of the United States, and a resident of New Britain, in the county of Hartford and State of Connecticut, have invented certain new and useful Improvements in Car-Fenders, of which the following is a full, clear, and exact description, whereby any one skilled in the art can make and use the same.

My invention relates to the class of apparatus adapted to be secured to the front part of a vehicle moving on tracks, as a car or the like, and it is particularly adapted for use on street-cars.

The object of my invention is to provide an apparatus of this general class which shall effect the purpose of preventing injury to a person on the track and when struck by the fender, and which shall enable that result to be obtained with comparative certainty, the device at the same time offering no obstruction to the mechanism required to propel and direct the motion of the car.

To the end stated my invention consists in the details of the several parts making up the apparatus as a whole and in the combination of the parts, as more particularly hereinafter described, and pointed out in the claims.

Figure 1:
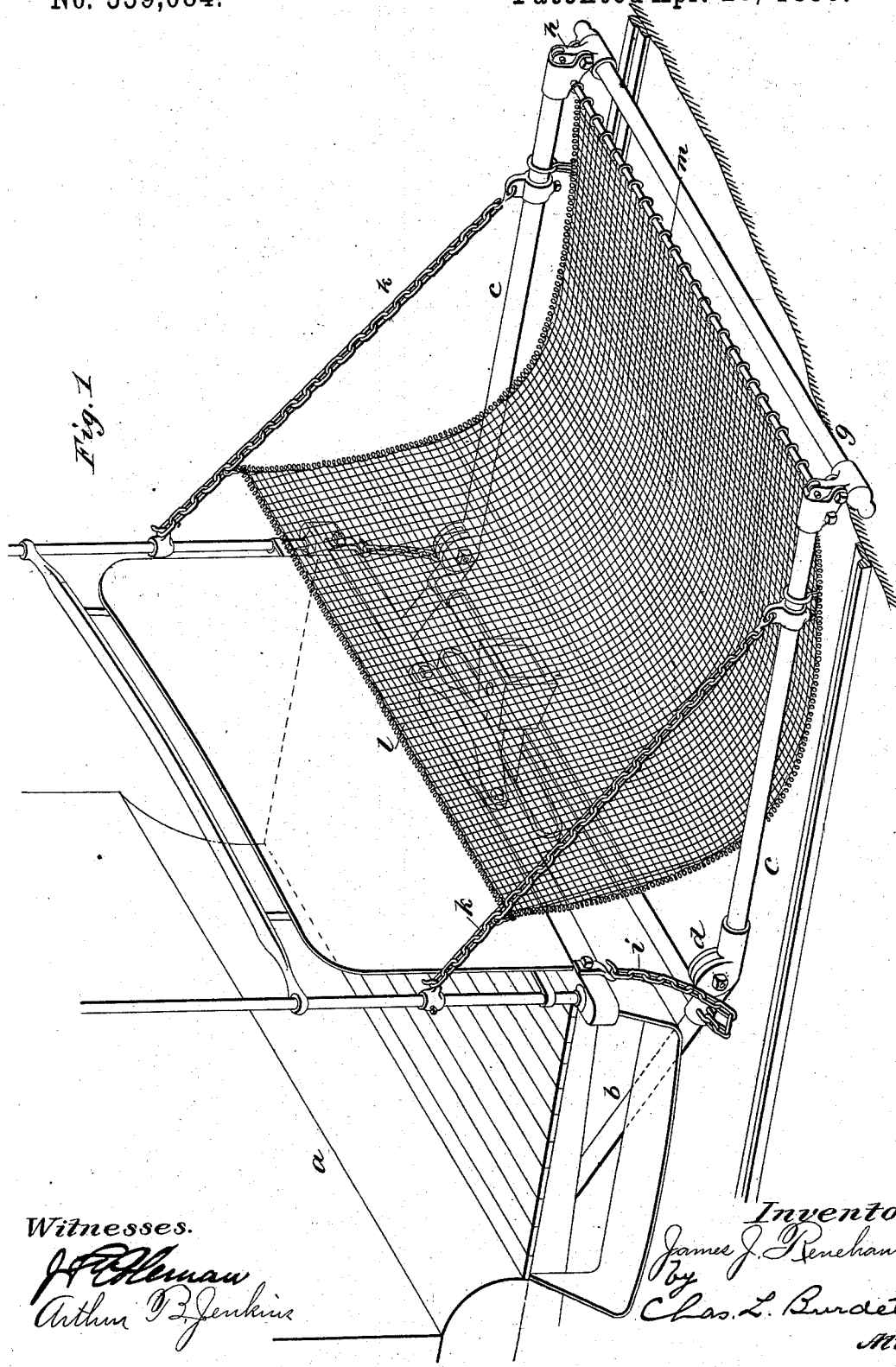
Figure 2:
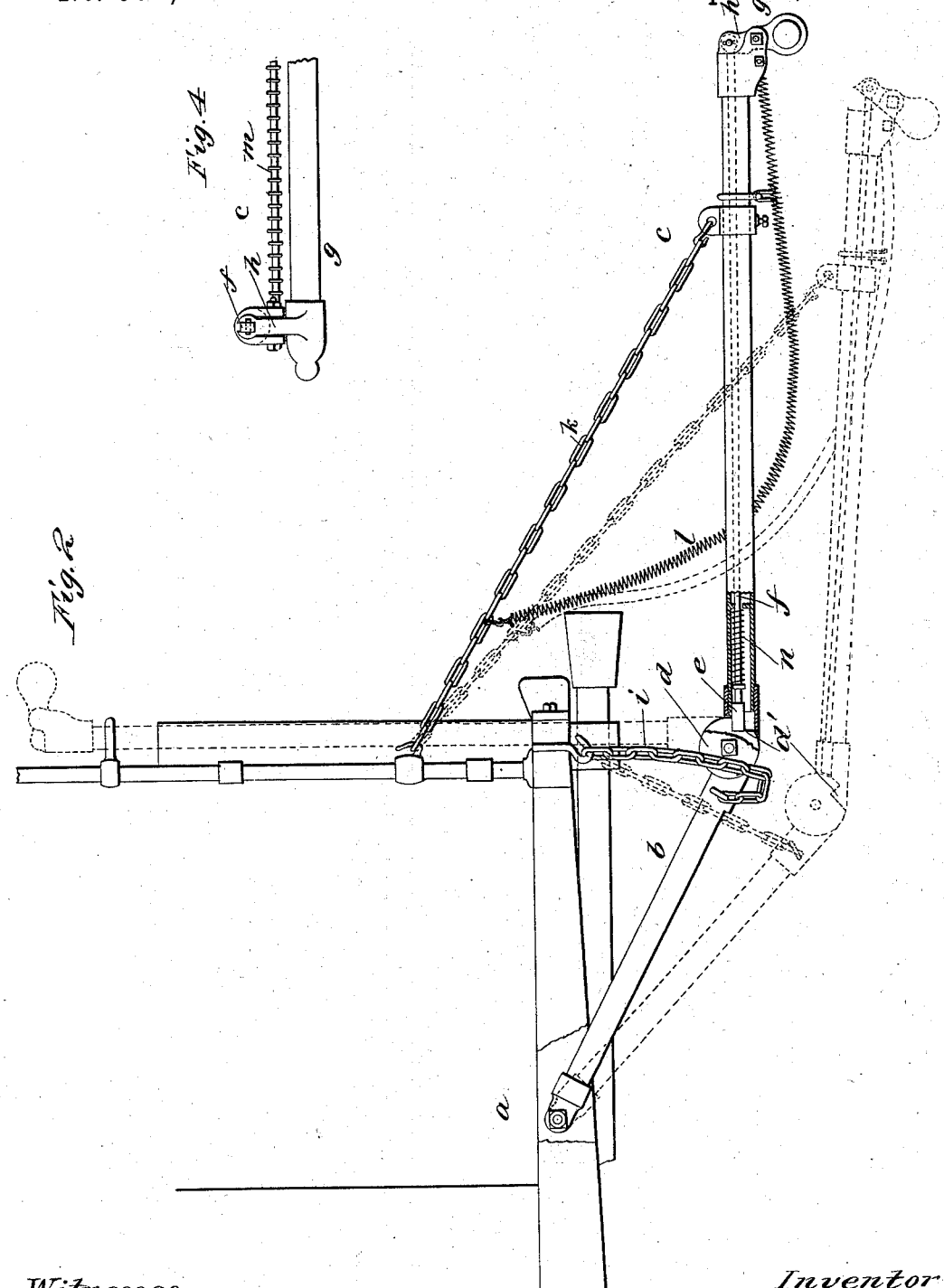
Figure 3:
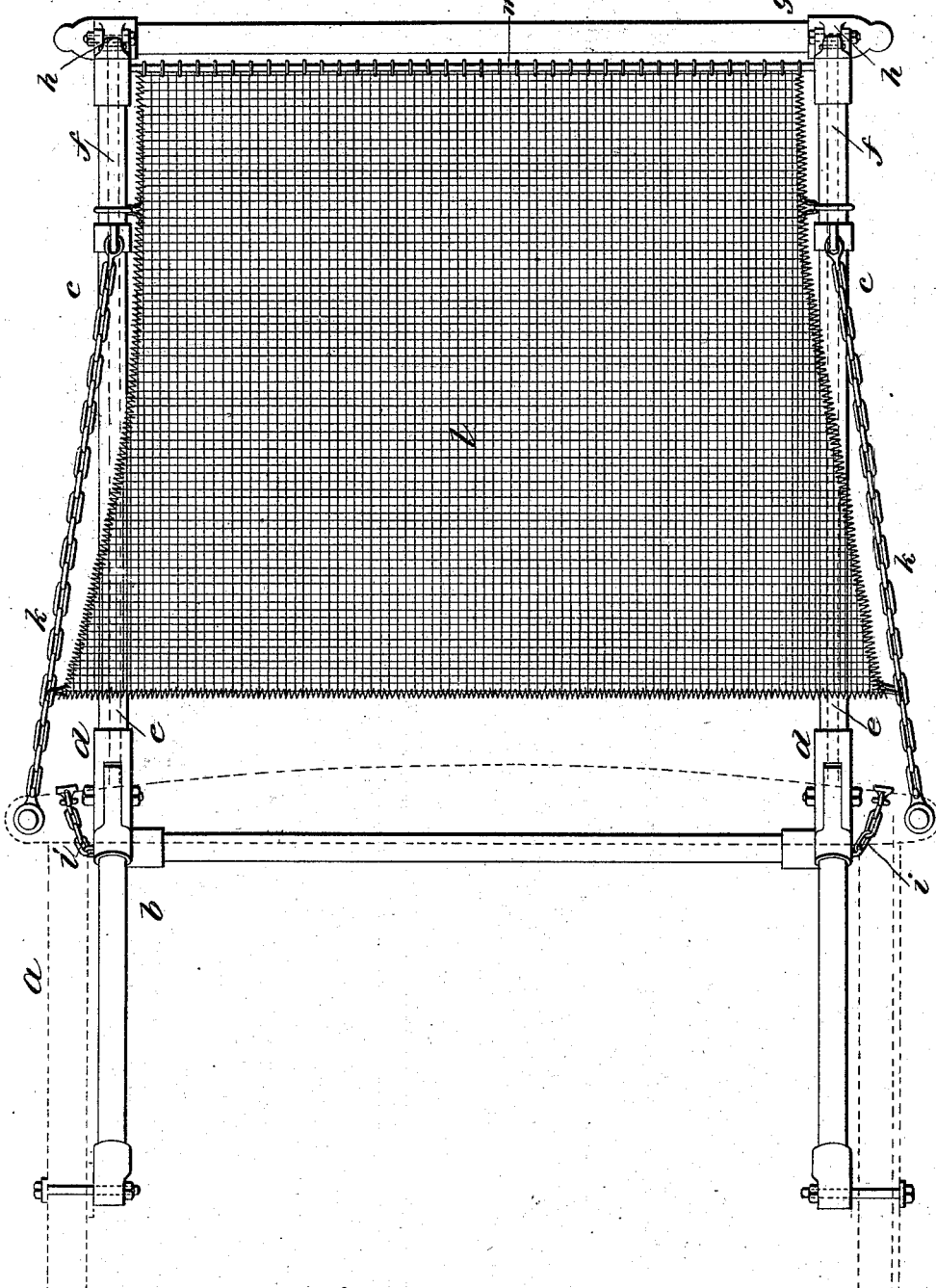

Referring to the drawings, Figure 1 is a perspective view of the front end of a car, showing my improved fender attached. Fig. 2 is a detail view, in side elevation, of my improved fender shown attached to a car and with parts cut in section to show construction, the trip being shown in its normal position to lock the joint. Fig. 3 is a plan view of the fender attached to a car. Fig. 4 is a detail front view of one side of the front end of the fender-frame.

The main feature of my invention consists in providing a car-fender made in jointed sections and combined with mechanism by means of which the fender, on striking an obstacle, drops and draws back. The lowering of the fender automatically brings it nearer to the track and prevents an obstacle from being crowded under the fender, and at the same time the retraction of the fender makes it less liable to injure a person who may be struck by it, the force of the blow being greatly lessened.

In the form of invention shown and described herein there are two sections, a rear section $b$, pivoted to the car $a$ and projecting downward and forward therefrom, a front section $c$, hinged to the rear section, and a locking device formed at the joint between the sections. The side parts of the sections are preferably formed of tubes joined as at $d$, and the joint is constructed so that the one part has a shoulder $d'$ with which a bolt $e$ borne in the other part engages. The bolt is connected with a trip-rod $f$, which extends along (in this instance through) the side of the frame of the front section.

A trip $g$ is attached to the front end of the fender and is connected with the trip-rod $f$ in such manner as to cause the bolt $e$ to be withdrawn from engagement with the shoulder $d'$ and allow the fender to drop and retract. In the form of device herein shown for accomplishing this result a trip-lever $h$ is pivoted on each side of the fender-frame, one end of the trip-lever being connected with the trip-rod $f$, and the other end of the trip-lever having secured thereto the trip $g$.

A stop $i$ is secured to the frame of the car and to the rear section $b$ of the fender-frame, a chain in this instance being provided. A support $k$ is also secured to the frame of the car and to the front section of the fender-frame. When the fender is in position for use, it is held in its raised position by means of the support $k$ and the bolt at the locking-joint; but when the trip device has acted to withdraw the bolt the fender swings downward and backward, in which position it is held by the stop $i$ and support $k$.

A net $l$ or like device is secured to the fender in such manner as to practically cover its whole area, the net being preferably secured to the front end of the fender-frame by means of rings located on a supporting-rod $m$, extending between the side parts of the fender-frame.

A spring $n$ is used to force the trip-rod $f$ backward, and thus hold the bolt $e$ normally in engagement with the shoulder $d'$, the spring being held by projections on the trip-rod and frame of the fender, respectively.

The operation of the device is as follows: The fender being in the raised position shown in Figs. 1 and 2 of the drawings, the bolt in engagement with the shoulder at the joint, and the trip $g$ in its forward position, the fender being supported by the bolt $e$ and support $k$, as an object, as a person, is struck by the fender the trip $g$ first encountering such object rocks the trip-lever and pulls the trip-rod forward and the bolt $e$ out of engagement with the shoulder $d'$ at the joint. This automatic action of the parts allows the fender to immediately drop and retract, in which position it is held by the support $k$ and stop $i$. This retraction and dropping of the fender provides two means that greatly lessen the chance of injury to the person struck. First, the retracting of the fender greatly lessens the force of the blow struck and lessens the chance of injury in this regard, and, second, the fender being dropped to a position near the ground forces the person into the net, by which he is carried along, the dropping of the fender preventing any chance of the person being crowded under the fender and injured thereby.

By the construction of my improved fender with jointed sections means are provided whereby the fender can be folded in an out-of-the-way position when not required for use.

The front section of the fender may be folded up against the front of the car, as shown in dotted outlines in Fig. 2 of the drawings, or the stop $i$ may be detached from the fender and the latter swung backward underneath the car, in which position the rear section $b$ of the fender-frame will project backward from its pivot and lie practically parallel to the bottom of the car, and the front section $c$ will project forward from its pivot, lying practically parallel and against the rear section.

I claim as my invention—

1. In combination with a car, a sectional and movable fender pivoted to the car at its rear end, whereby it normally retains its lowermost position when tripped, the two sections being connected by a pivoted joint, a support for the forward end of the forward section, and means for temporarily holding the forward end of the rear section in a raised position, all substantially as described.

2. In combination in a car-fender, a sectional side part supported at its front and rear ends in a raised position, and having a locking-joint, and means for automatically unlocking the joint from the front end of the fender-frame, whereby the fender is automatically and simultaneously dropped and retracted while maintained in a practically horizontal position, all substantially as described.

3. In combination in a car-fender, a sectional side part pivotally supported at its front and rear ends, a locking-joint between the sections, a bolt to lock the joint, and a trip-rod independent of the frame extending from the bolt to the front end of the fender-frame whereby the joint is automatically unlocked and the fender automatically and simultaneously dropped and retracted while maintained in a practically horizontal position, all substantially as described.

4. In combination with the frame of a car, the rear section of a fender-frame pivoted thereto, a front section pivoted to the rear section, a locking-joint located at said pivot, a pivotal support for the front end of the fender-frame, and means for automatically unlocking the joint between the sections from the front end of the frame, whereby the fender is automatically and simultaneously dropped and retracted while maintained in a practically horizontal position, all substantially as described.

5. A car-fender composed of sections and pivotally supported at its front and rear ends, a locking-joint connecting the sections of the side parts, a rear support to limit the downward-swinging movement of the fender, a shoulder located in the joint, a bolt in engagement with the shoulder, a trip-rod extending from the bolt to the forward end of the frame, a trip-lever pivotally supported to the front end of the frame and connected to the trip-rod, and means for operating the trip-lever to unlock the joint whereby the front section of the fender is automatically simultaneously dropped and retracted while maintained in a practically horizontal position, all substantially as described.

6. A sectional car-fender pivotally supported at its front and rear ends, a locking-joint connecting the sections, a rear support to determine the extent of downward movement of the fender, a shoulder located on the joint, a bolt in engagement with the shoulder, a trip-rod extending from the bolt to the front end of the frame, a trip-lever supported at the front end of the frame, and a trip device secured to the trip-lever and extending across the front end of the fender-frame, by the operation of which the fender is automatically simultaneously dropped and retracted while maintained in a practically horizontal position, all substantially as described.

7. A sectional car-fender pivotally supported at its front and rear ends, a locking-joint connecting the sections, a rear support to determine the extent of downward movement of the fender, a shoulder located on the joint, a bolt in engagement with the shoulder, a trip-rod extending through the tubular side part of the front section of the frame to the front end thereof, a trip-lever pivoted to the frame and to the trip-rod, a trip device secured to the trip-lever and extending across the fender-frame from side to side, means for operating the trip device whereby the front section of the fender-frame is automatically simultaneously dropped and retracted while maintained in a practically horizontal position, and a net supported on the fender-frame, all substantially as described.

JAMES J. RENEHAN.

Witnesses:
ARTHUR B. JENKINS,
JULIA STERN.